March 30, 1965   R. W. O'NEEL ETAL   3,175,336
PORK DISPENSING APPARATUS

Filed May 18, 1962   4 Sheets-Sheet 1

INVENTORS.
ROBERT W. O'NEEL and
BY ALEXANDER F. HINES

Lockwood, Woodard, Smith & Wiikart
Attorneys

March 30, 1965
R. W. O'NEEL ETAL
3,175,336
PORK DISPENSING APPARATUS
Filed May 18, 1962
4 Sheets-Sheet 2
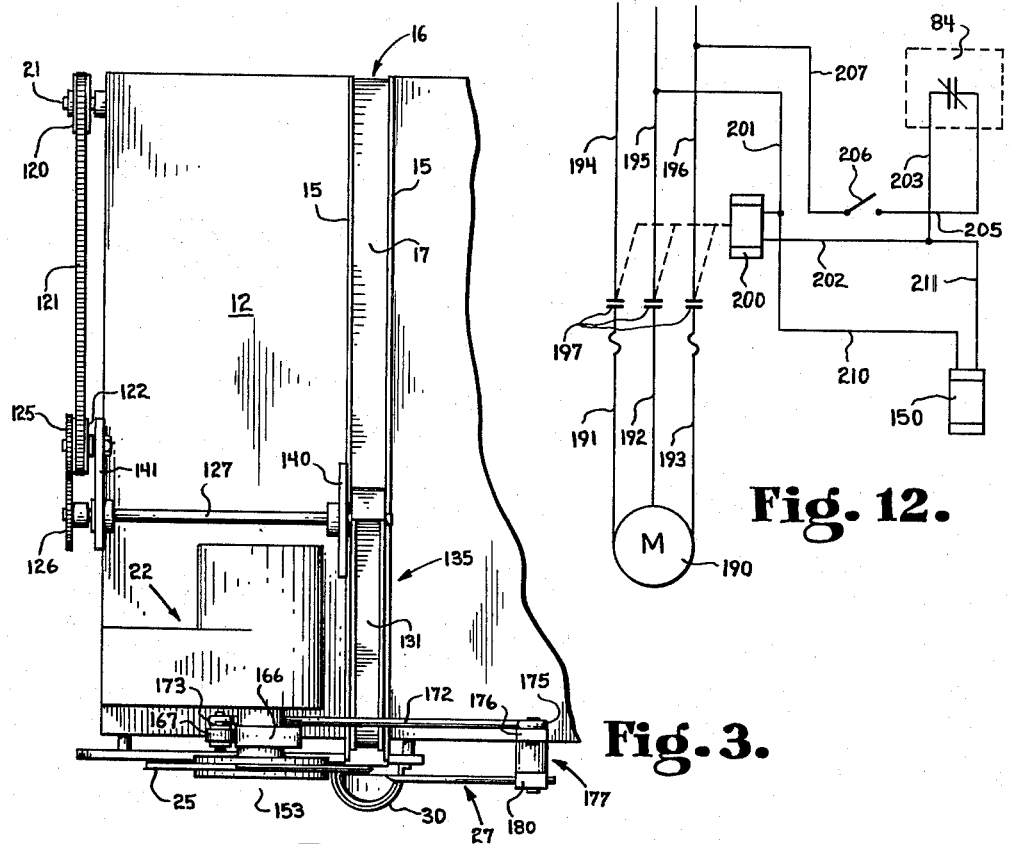
Fig. 12.
Fig. 3.
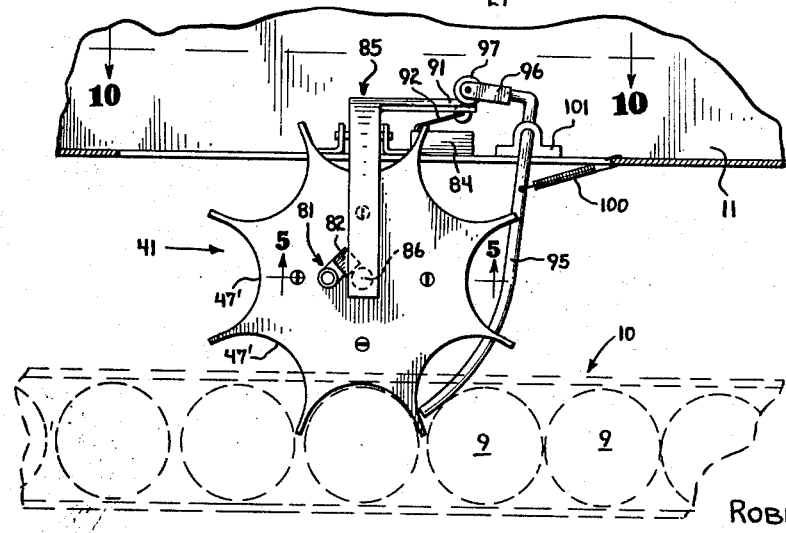
Fig. 4.
INVENTORS.
ROBERT W. O'NEEL and
BY ALEXANDER F. HINES
Lockwood, Woodard, Smith & Weikart
Attorneys March 30, 1965 R. W. O'NEEL ETAL 3,175,336
PORK DISPENSING APPARATUS
Filed May 18, 1962 4 Sheets-Sheet 3

INVENTORS.
ROBERT W. O'NEEL and
BY ALEXANDER F. HINES
Lockwood, Woodard, Smith & Weikart
Attorneys March 30, 1965    R. W. O'NEEL ETAL    3,175,336
PORK DISPENSING APPARATUS Filed May 18, 1962    4 Sheets-Sheet 4

INVENTORS.
ROBERT W. O'NEEL and
BY ALEXANDER F. HINES
Lockwood, Woodard, Smith & Weikart
Attorneys

United States Patent Office 3,175,336
Patented Mar. 30, 1965

3,175,336
PORK DISPENSING APPARATUS
Robert W. O'Neel, Box 221, Shelbyville, Ind., and
Alexander F. Hines, Flat Rock, Ind.
Filed May 18, 1962, Ser. No. 195,714
11 Claims. (Cl. 53—58)

This invention relates to the loading of containers and more particularly relates to a device for loading into containers substantially uniform portions of a solid substance, such as, for example, pieces of pork into cans of pork and beans, the invention also relating to certain sub-combinations of said device.

It has been conventional practice to load cans of pork and beans by dropping pieces of pork into the cans by hand. One object of this invention is to provide a machine which automatically cuts and drops one properly sized piece of pork or the like into each can passing the machine.

Past attempts to feed pieces of pork into cans have been unsatisfactory because of the tendency of the fat in the meat to stick to and clog the feeding device. A further object of this invention is to provide apparatus incorporating improved means for insuring that cut pieces of pork do not adhere to the apparatus.

Another object of the present invention is to provide apparatus of this type capable of depositing pieces of pork or the like into cans moving past the apparatus upon a can conveyor.

Still another object of the invention is to provide apparatus of this type incorporating improved means for stopping the apparatus when the can line on the can conveyor jams or when there are breaks in the can line (feeding is intermittent) so as to insure that the pork or the like is not wasted.

Another object of the present invention is to provide apparatus of this type incorporating means insuring that the dispensing of the pork or the like into the can is directly into the can and only when the can is properly positioned for reception of the pork.

Further objects and advantages will become apparent as the description proceeds.

One embodiment of the apparatus of the present invention might include a conveyor for moving an elongated strip of pork or the like, a rotary knife mounted at the exit end of the conveyor, and a star wheel which is positioned below the exit end of the conveyor and receives cans moving along a can conveyor past the rotary knife, said star wheel rotating with the cans and sensing the movement of the cans. There is provided means for intermittently driving the pork conveyor and for simultaneously rotating said knife to cut portions from the elongated strip. The star wheel is operatively connected to the drive means in such a manner as to control the operation thereof to deposit portions of the strip into the cans only when the cans are positioned directly under the rotary knife.

The full nature of the invention will be understood from the accompanying drawings and the following description and claims.

FIG. 3 is a top plan view of the structure illustrated in FIG. 2 but with certain portions of the structure broken away.

FIG. 4 is an enlarged horizontal section taken along the line 4—4 of FIG. 2 in the direction of the arrows.

FIG. 12 is an electrical schematic diagram for the pork dispensing device.

Figure 1:
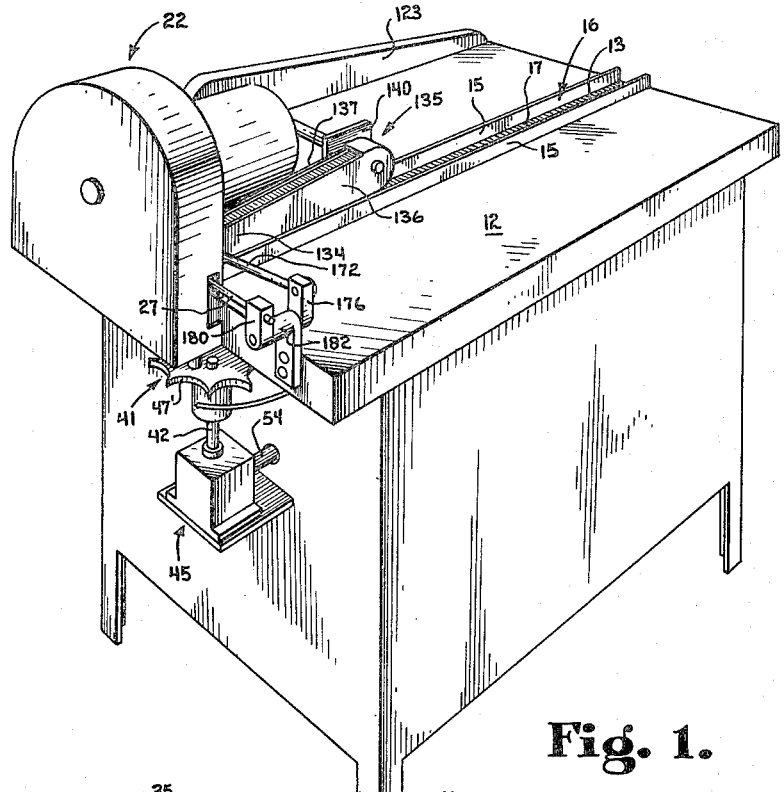
FIG. 1 is a perspective view of a pork dispensing apparatus constructed according to the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 9:
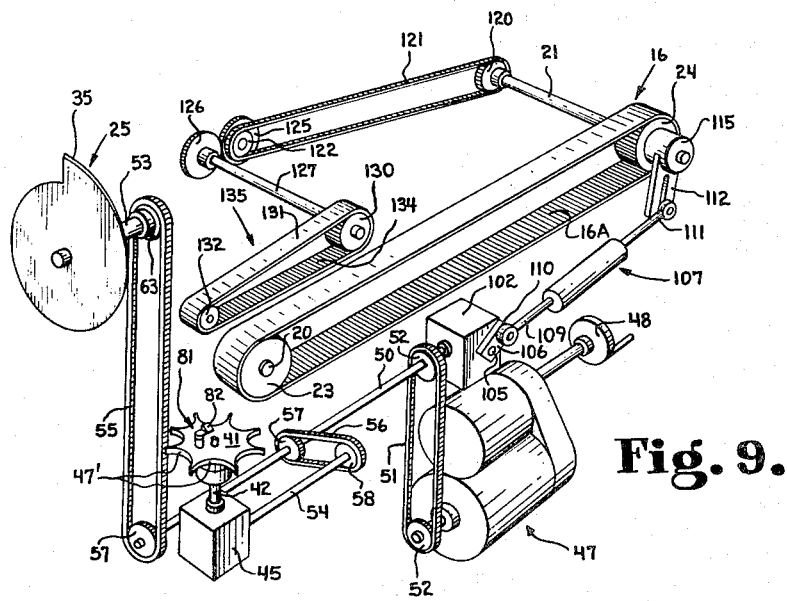
FIG. 9 is a perspective view of the structure illustrated in FIG. 1, but with various portions of the structure removed to show the moving parts and operating components of the device.

Referring now more particularly to the drawings, there is illustrated a pork dispensing device adapted to deposit the single piece of pork of predetermined size into each of a plurality of cans 9 moving along a conveyor 10. The structure illustrated in FIG. 1 may be placed in a plant already having a can conveyor in order to deposit pork into cans moving on the conveyor. The device includes a frame 11 having a table 12 mounted thereon. The table 12 is discontinuous. That is, it has a central opening 13 which extends the complete length of the table from front to rear and is bounded by a pair of upright parallel guides 15 fixed to the table and positioned on opposite sides of a conveyor 16 the upper surface 17 of which is positioned within the opening 13. As shown in FIG. 9, the conveyor 16 includes a pair of parallel rotatable shafts 20 and 21 having toothed wheels or sprocket wheels 23 and 24 thereon. The conveyor further includes a toothed belt 16A which is positively engaged by wheels 23 and 24 and is driven by the wheel 24. The shafts 20 and 21 are mounted for rotation upon the frame 11.

At the forward end of the table 12, there is mounted a guard 22 which houses a rotatable blade 25. The blade 25 functions to cut off portions of predetermined size from an elongated strip 26 (only FIG. 2) of pork which travels along the conveyor 16. After the blade 25 has functioned to cut a portion from the strip 26, a dispenser arm 27 swings downwardly and strikes the portion forcing it through a guide or funnel 30 which is fixed to a steam heated anvil 31, which is, in turn, fixed to the forward end of the table 12.

The anvil 31 includes an anvil surface 32 which cooperates with the cutting portion 35 of the rotary blade 25 to shear off the respective portions of pork. The anvil further includes a hollow portion 36 to which steam or hot water is delivered through an inlet conduit 37, the steam or hot water leaving the anvil through an outlet conduit 40. Alternatively, the anvil 31 may receive heating coils in its hollow portion which would receive electrical energy to heat the anvil. The purpose in heating the anvil is to prevent juices from the fatty pork from solidifying upon the anvil within the funnel 30 and adjacent the anvil surface and causing an unsanitary condition and clogging of the machine after a long period of operation.

As mentioned, the present device is used with a can conveyor 10. A star wheel 41 is rotatably mounted upon the frame 11 by means of a shaft 42 and a gear reduction unit 45. The gear reduction unit is conventional and may be, for example, type No. VOT-8-C Special, manufactured by Ohio Gear Company of Cleveland, Ohio. The cans 9 moving along the conveyor 10 move into the pockets 47' in the outer periphery of the star wheel so that the speed of rotation of the star wheel reflects the speed of movement of the cans 9.

Both the rotary blade 25 and the star wheel 41 are driven by a power unit 47, which may be, for example, a Reeves Moto Drive #111E-18, ¼ horsepower capacity 220/440-3-60 520 to 130 r.p.m. assembly #102 handwheel W manufactured by Reeves Pulley Co. of Columbus, Indiana. As suggested by this terminology, the power unit 47 is adjustable in speed (by means of handwheel 48) so that the speed of the present device can be adjusted to correspond to the speed of the cans 9 moving on the conveyor 10. The power unit 47 is positively connected to a shaft 50 by means of a chain 51 received about sprocket gears 52 fixed respectively to the drive shaft of the power unit 47 and to the shaft 50. The shaft 50 positively drives the rotary blade shaft 53 and the shaft 42 associated with the star wheel by means of chains 55 and 56 which are received upon sprockets 57, 58 and 63 fixed to the shaft 50 and the shafts 54 and 53. The shaft 54 positively drives the shaft 42 through the gear reduction unit 45.

Figure 6:
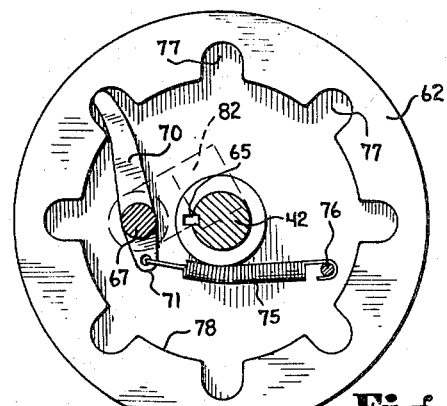
FIG. 6 is a horizontal section taken along the line 6—6 of FIG. 5.
Figure 7:
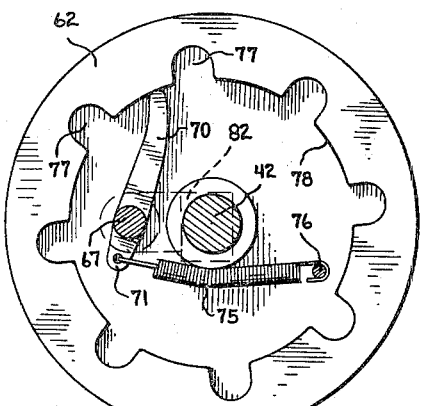
FIG. 7 is a view similar to FIG. 6 showing a different operating position.
Figure 5:
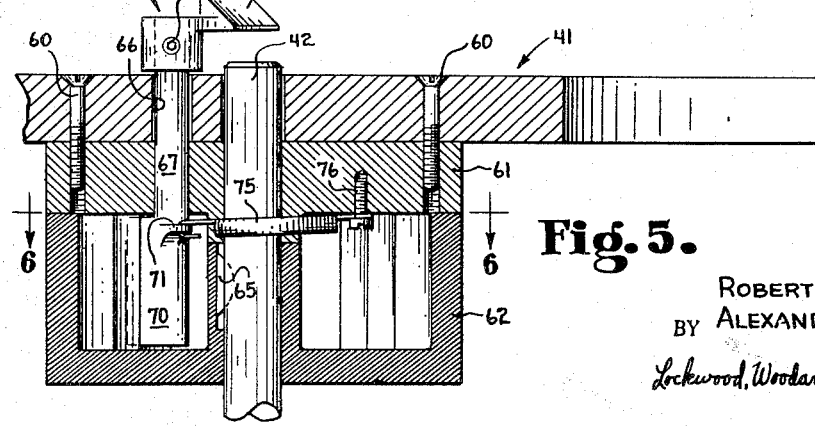
FIG. 5 is an enlarged vertical section taken along the line 5—5 of FIG. 4 in the direction of the arrows.

Referring to FIGS. 5-7, the star wheel 41 is fixed by means of screws 60 to an annular member 61 through which the shaft 42 projects. The annular member 61 and the star wheel 41 are rotatably received upon the shaft 42. An upwardly opening cup-shaped member 62 is keyed to the shaft 42 by the key 65 and thus rotates fixedly with the shaft. Pivotally mounted upon the annular member 61 and extending through a suitable aperture 66 in the star wheel 41 is a shaft 67 which has cast integrally as a part thereof a finger 70.

The shaft 67 also has formed thereon an eye 71 which receives one end 72 of a tension spring 75, the other end of which is secured to the annular member 61 by means of a screw 76. The spring 75 normally functions to pivot the finger 70 into one of a plurality of recesses or indentations 77 formed in the inside wall 78 of the cup-shaped member 62.

At the upper end of a shaft 67, there is fixed by means of set screw 80 a cam member 81 which has a sloping cam surface 82, this surface normally being positioned as shown in dotted lines in FIG. 6 and solid lines in FIG. 4.

Assuming now that a plurality of cans are moving along the conveyor 10 (which is provided with its own power means), the cans move into the recesses 47' in the external surface of the star wheel 41. If the star wheel rotates at a slower speed than the shaft 42, which is positively connected to the drive means 47, then the cup-shaped member 62 rotates with respect to the shaft 67. Thus, the finger 70 moves out of one of the recesses 77 and travels along the inside wall 78. In other words, the finger 70 moves from the position of FIG. 6 to FIG. 7. Such pivoting of the shaft 67 moves the cam surface 82 from the position of FIGS. 4 and 6 to the position of FIGS. 7 and 8 which is at the axis of rotation of the shaft 42.

When the cam surface 82 is in the position of FIG. 7, the member or lever 85 is pivoted upwardly actuating a limit switch 84. It can be seen from FIGS. 2, 4, 8 and 10 that the member 85 has a downwardly projecting pointed portion 86 which is positioned axially of the shaft 42. Thus, when the cam surface 82 is positioned as in FIG. 7, the pointed portion 86 is raised, pivoting the member 85 about a shaft 87 received within suitable brackets 90 fixed to the frame 11 of the device. Upward movement of the pointed portion 86 causes movement of the lower portion 91 against the actuating arm 92 of the switch 84.

As will be explained in connection with the operation of the device below, the opening of the switch 84 by the depression of the actuating arm 92 cuts off electrical power to the power means 47, thus temporarily stopping or at the least slowing down the rotation of the blade 25 until the cans moving along the track or conveyor 10 catch up with the device. In other words, the power means 47 is cut off until the finger 70 is again seated within one of the indentations 77 in the cup-shaped member 62. When the finger 70 is so seated, the rotary blade 25 and the depositer arm 27 will cut and then deposit a portion of the pork 26 at precisely the same instant as one of the cans 9 moves directly beneath the funnel 30.

The limit switch 84 is also controlled by an arm 95 which permits the actuating arm 92 of the switch 84 to move to the projected position of FIG. 4 when the arm 95 is engaged by cans 9 on the can conveyor 10. It will be noted that the arm 95 has a horizontally extending portion 96 with a wheel 97 rotatably mounted at the extending end thereof. This wheel 97 engages the lower end 91 of the lever 85. Thus, the actuating arm 92 of the switch 84 may be depressed by either the member 85 or the arm 95. When there are no cans on the conveyor adjacent the star wheel to actuate the arm 95, a spring 100 normally retains the arm 95 in the dotted line position of FIG. 8. It will be noted that the arm 95 is pivotally mounted upon the frame 11 by means of a suitable bearing 101.

The shaft 50 also drives a pair of meshing bevel gears (not shown) received within a housing 102 (right angle drive gear box), one of the bevel gears being fixed to a shaft 105 rotatably mounted upon the housing 102 and fixed to an arm 106 and the other bevel gear being fixed to shaft 50. The arm 106 has one end 109 of a pitman 107 secured to its distal end 110. The pitman 107 is secured at its opposite end 111 to a radially extending arm 112 fixed to a one-way clutch 115. The arm 112 extends radially a substantially greater distance from the shaft 21 about the axis of which it pivots than does the arm 106 extend radially from the shaft 105 about which it rotates. Thus, rotation of the arm 106 about the shaft 105 produces oscillation of the arm 112 rather than rotation thereof.

Such oscillation of the arm 112 produces movement of the conveyor 16 and particularly of the top surface 17 thereof only in a forward direction toward the forward end of the table 12 and particularly toward the rotating blade 25. In other words, the one-way clutch 115 rotates the sprocket or wheel 24 and shaft 21 in a counter-clockwise direction as viewed in FIG. 9, but does not rotate the wheel 24 in a clockwise direction. The one-way clutch 115 may be a type No. 1½-1-1 overrunning clutch, manufactured by Hilliard Corporation of Elmira, New York. All of shafts 20, 21, 50 and 54 are mounted for rotation upon suitable bearings (not shown) fixedly mounted upon the frame 11 of the device.

As mentioned, the shaft 21 is driven by the one-way clutch 115. Fixedly mounted upon the shaft 21 is a sprocket 120 which drives a chain 121 which drives a sprocket 122. The sprocket 122 has gear 125 mounted thereon which meshes with the teeth of a gear 126 positively driving a shaft 127. The shaft 21 extends through a housing 123 which is fixed to the frame and rotatably mounts the gear 122. The shaft 127 has a toothed wheel 130 fixed thereon, said wheel receiving a toothed belt 131 which also extends about a toothed wheel 132 mounted for rotation a spaced distance away from the wheel 130. The structure 127, 130, 131 and 132 makes up a partially floating upper conveyor 135, the end 134 (FIG. 1) of which is movable upwardly and downwardly under the action of gravity and pivotal about the axis of shaft 127.

The upper conveyor 135 further includes the sideward members 136 and 137 which are fixed in spaced relation and rotatably receive the shaft 127 and rotatably mount the wheel 132. A pair of mounting brackets 140 and 141 are fixed to the table 12 and rotatably mount the shaft 127. It can be appreciated that the end 134 of the upper conveyor 135 can adjust upwardly and downwardly to accommodate elongated strips of pork having varying vertical dimensions. More importantly, the pivotal nature of the end 134 of the upper conveyor 135 provides a pressure on the pork strip which aids the positive forward drive of the pork.

It can be appreciated that the conveyor 16 as well as the conveyor 135 are both positively driven and are intermittently driven since both are driven from and through the shaft 21 and one-way clutch 115. Thus, the strip of pork received between the two conveyors is positively moved forwardly of the device. The oscillation of the arm 112 is so timed that the strip of pork is only moved forwardly when the blade 25 has moved out of the path of the strip of pork. When the blade 25 is cutting, the conveyors and pork are stationary.

Figure 11:
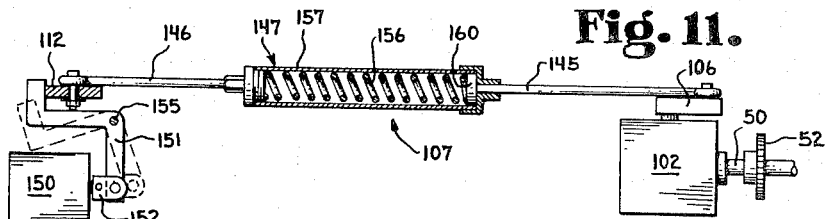
FIG. 11 is a side elevation partly in section of a pitman and associated structure forming a part of the present device.
Figure 10:
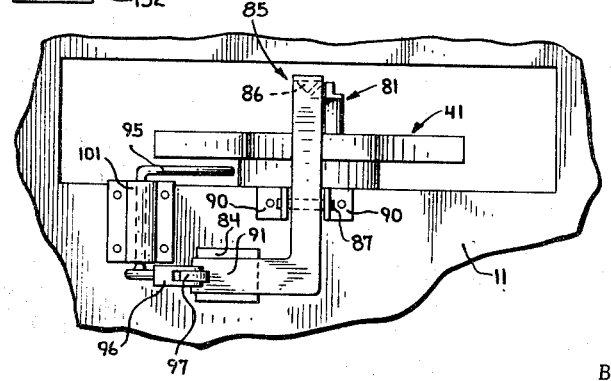
FIG. 10 is a vertical section taken along the line 10—10 of FIG. 4.

FIG. 11 shows in detail the pitman 107. It can be seen that the pitman includes a pair of rods 145 and 146 which are connected by a spring assembly 147. Fixedly mounted upon the frame is a solenoid 150 such as, for example, a type No. 100A3A, manufactured by General Electric Company of Bloomington, Illinois. The solenoid has a lever 151 pivoted to the armature 152 thereof. The lever 151 is pivoted to the frame by the shaft 155. The solenoid 150 includes a spring (not shown) which retains the armature of the solenoid and the lever 151 in the solid line position of FIG. 11 except when the solenoid 150 is energized. When the solenoid 150 is energized, the solenoid spring is overpowered and the lever is moved to the dotted line position in FIG. 11.

The spring assembly 147 includes a spring 156 received within the cylindrical container 157. A piston 160 is slidable within the container 157 and is fixed to the rod 145. The spring 156 is of sufficient strength to prevent rotation of the arm 106 when the lever 151 is in the solid line position (that is, the spring is strong enough to prevent a complete rotation). Thus, assuming that the device is operating and the power to the power means 47 is cut off and the lever 151 moves to its solid line position, further complete rotations of the arm 106 will be prevented by the spring assembly 147, and thus the power means 47 will be resiliently braked. It should be understood, however, that the spring 156 is sufficiently weak to absorb the inertia of the power means without undue stress upon the mechanical system.

Figure 2:
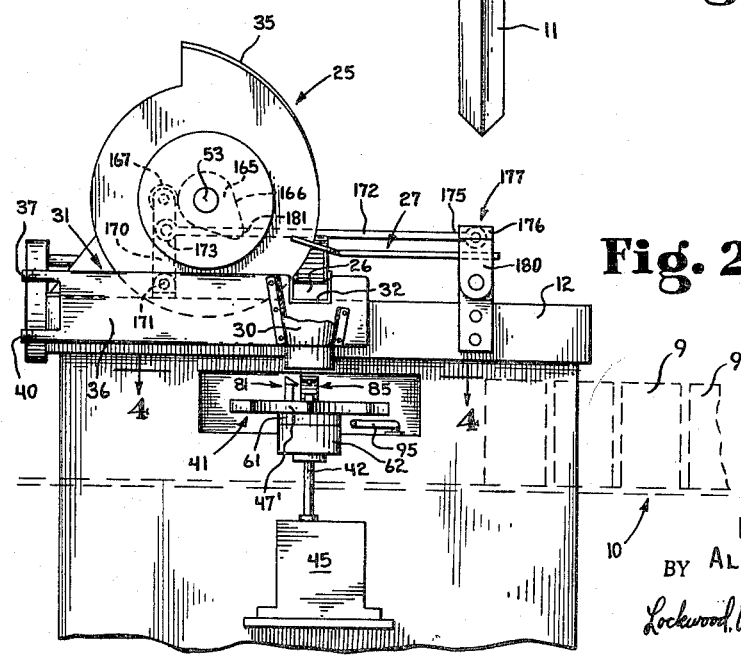
FIG. 2 is a front end elevation of the structure illustrated in FIG. 1 but with certain portions removed.

Referring to FIG. 2, a cam 165 is fixed to the shaft 53 of the rotary blade 25. The cam 165 has a peripheral cam surface 166 which rides on a wheel 167 rotatably mounted upon an arm 170 pivoted to the frame 171. A connecting rod 172 is pivoted at one end 173 to the arm 170 and is pivoted at the other end 175 to an arm 176 of a member 177, which includes two normally upright arms, the arms 176 and a further arm 180.

The dispenser arm 27 is fixedly mounted upon the arm 180. Thus, each time the blade 25 rotates, a raised portion 181 of the cam surface 166 bears against the wheel 167 forcing it leftwardly and pivoting the arm 176 leftwardly causing the member 177 to pivot within a bearing 182 fixed to the table 12. As the member 177 pivots, the dispenser arm 27 swings downwardly striking the portion of pork which has just been cut and forcing it into the funnel 30 by which is it guided into a can on the conveyor 10 below.

Referring to FIG. 12, the power means 47 includes an electrical motor 190 which is provided with three-phase power through lines 191, 192 and 193. Lines 191–193 are connected to lines 194, 195 and 196 by normally open contacts 197 of a relay 200. The relay 200 is supplied with power through lines 201, 202 and 203, the normally closed limit switch 84, line 205, on/off switch 206 and the line 207. The lines 201 and 207 are electrically connected to the power source lines 195 and 196.

It can be appreciated that when the on/off switch 206 is closed, power will be supplied to the relay 200, which will close the contacts 197, causing the motor to operate. The solenoid 150 is supplied with power through the lines 201, 210, 211 and 203, the limit switch 84 and the line 205, the on/off switch 206 and the line 207. Thus, when the on/off switch 206 is closed, the solenoid 150 is also energized, causing it to move to the dotted line position of FIG. 11, thus permitting the drive means 47 to oscillate the arm 112 and operate the device.

As explained above, the limit switch 84 may be opened by depression of its actuating arm 92. Such depression results either from the actuation of the lever 85 or the actuating arm 95. When the limit switch 84 is so actuated, the solenoid 150 and the relay 200 are deenergized. Such deenergization results in the lever 151 moving to the solid line position of FIG. 11, blocking further oscillation of the arm 112 and also results in deenergization of the motor 190. Thus, further intermittent forward movement of the conveyor 16 is blocked, as well as further rotation of the shafts 50, 53 and 54.

Assuming that the device is operating and the cans are moving along the conveyor 10, the hand wheel 48 is rotated to adjust the speed of the device to a speed at which the star wheel 41 is rotating generally at a speed equal to the movement of the cans. In other words, the star wheel is being driven without the assistance of the cans at a speed approximately equal to the speed of the cans by means of the shaft 42.

Figure 8:
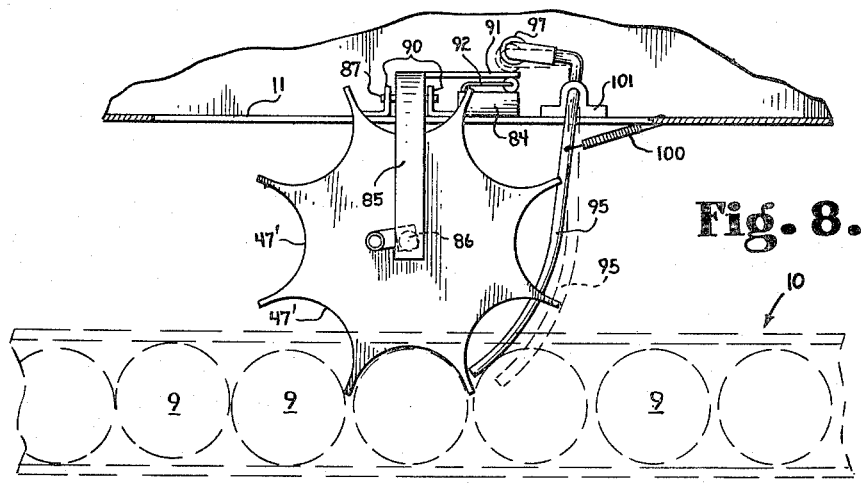
FIG. 8 is a view similar to FIG. 4 showing a different operating position.

The actuating arm 95 is retained in the solid line depressed position of FIGS. 4 and 8 and the cam surface 82 of the cam member 81 is retained away from the axis of the star wheel and in the position shown in FIG. 4. The cam member 81 retains this position, as above described, by reason of the fact that finger 70 is seated in one of the indentations 77. The rotary blade 25 is so timed with the star wheel 41 that each time a portion of pork is cut by the blade and is struck by the dispensing arm 27, one of the cans 9 is directly below the funnel 30.

Assuming now that the cans jam on the conveyor 10, the star wheel will no longer rotate, the finger 70 will move out of its indentation 77 and the arm 85 will be actuated to depress the limit switch actuating arm 92 to open the limit switch. Thus, the relay 200 and solenoid 150 will be deenergized and the complete device will be stopped and braked by the lever 151 whereby no further pieces of pork will be deposited. As soon as the can line becames unjammed and the star wheel has rotated sufficiently to again lock the finger 70 in one of the indentations 77, the power means 47 will again be energized and the device will again operate to deposit pork in the cans. A brief slowing down or stopping of the cans will produce the same results but with lesser intensity, it being understood, however, that the apparatus always brings itself back into time dispensing only when a can is directly below the funnel.

Assuming that there are no cans on the conveyor 10, the arm 95 will be moved to the dotted line position of FIG. 8 by the spring 100 and the actuating arm 92 of the limit switch 84 will be depressed, cutting off operation of the machine as above described, and thus preventing any further deposition of pork portions.

From the above description, it will be obvious that the present invention provides an improved machine which will automatically cut and drop one properly sized piece of pork or the like into each can passing the machine. It will also be evident that the present invention provides apparatus incorporating improved means for insuring that the cut pieces of pork do not adhere to the apparatus. It will be further evident that the apparatus of the present invention provides improved means for stopping the apparatus and preventing further deposition of pork when the can line on the conveyor jams or when the can feed is intermittent, thus insuring that pork is not wasted.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. Apparatus for depositing sliced portions of material into cans which comprises a conveyor for a length of material, a rotary knife at the exit end of said conveyor, a star wheel adjacent said rotary knife and adapted to be positioned adjacent a can conveyor to receive the cans in the recesses between the points of the star wheel's shape, said star wheel being free to rotate with said cans at the speed the cans are moving on said can conveyor, means for intermittently driving said material conveyor and for rotating said knife to cut portions from a length of material moving off of said material conveyor, said star wheel being operatively connected to said drive means to control the operation thereof to deposit portions in said cans according to the speed of said cans and only when the cans are positioned under said rotary knife.

2. Apparatus for depositing sliced portions of material into cans which comprises a conveyor for a length of material, a rotary knife at the exit end of said conveyor, a star wheel below said rotary knife and adapted to be positioned adjacent a can conveyor to receive the cans in the recesses between the points of the star wheel's shape, said star wheel being free to rotate with said cans at the speed the cans are moving on said can conveyor, means for intermittently driving said material conveyor and for rotating said knife to cut portions from a length of material moving off of said material conveyor, a sensing means arranged to sense whether cans are on said can conveyor adjacent said star wheel and for controlling said driving and rotating means in response thereto, said star wheel being operatively connected to said drive means to control the operation thereof to deposit portions in said cans according to the speed of said cans and only when the cans are positioned under said rotary knife.

3. Apparatus for depositing sliced portions of material into cans which comprises a frame, a conveyor for a length of material mounted on said frame, a rotary knife mounted on said frame at the exit end of said conveyor, a star wheel mounted on said frame below said rotary knife and adapted to be positioned adjacent a can conveyor to receive the cans in the recesses between the points of the star wheel's shape, said star wheel being free to rotate with said cans at the speed the cans are moving on said can conveyor, means for intermittently driving said material conveyor and for rotating said knife to cut portions from a length of material moving off of said material conveyor, a sensing means arranged to sense whether cans are on said can conveyor adjacent said star wheel and for controlling said driving and rotating means in response thereto, said star wheel being operatively connected to said drive means to control the operation thereof to deposit portions in said cans according to the speed of said cans and only when the cans are positioned under said rotary knife.

4. Apparatus for depositing sliced portions of material into containers which comprises a first conveyor, a rotary cutter blade positioned adjacent the exit end of said conveyor for cutting portions from a length of material moving on said conveyor, means for driving said knife and said first conveyor, a can conveyor positioned to move cans under the exit end of said material conveyor, a star wheel rotatably mounted adjacent said can conveyor and below said rotary cutter blade and positioned to receive the cans in the recesses between the points of the star wheels' shape, said star wheel being free to rotate with said cans at the speed the cans are moving on said can conveyor, a guide funnel fixed beneath the exit end of said material conveyor for guiding said portions into said cans, a dispenser arm pivotally mounted adjacent the exit end of said material conveyor and swingable downwardly past the blade to strike a portion into said funnel and a cam fixed with relation to said blade and arranged to actuate said dispenser arm each time said blade rotates, said star wheel being operatively connected to said drive means to control the operation thereof to deposit portions in said cans according to the speed of said cans and only when the cans are positioned under said funnel.

5. Apparatus for depositing sliced portions of material into containers which comprises a first conveyor, rotary drive means, a rotary cutter blade positioned adjacent the exit end of said conveyor for cutting portions from a length of material moving on said conveyor, said rotary blade being positively connected to said drive means for driving thereby, a container conveyor positioned to move cans under the exit end of said first conveyor, a star wheel positioned adjacent said container conveyor under the exit end of said first conveyor and having recesses about its periphery adapted to receive the containers as they move along said container conveyor, a one-way clutch connecting said drive means and star wheel in such a manner that said star wheel cannot rotate faster than a given speed determined by the speed of said drive means but can rotate at lesser speeds than said given speed by slipping of said one-way clutch, a limit switch arranged to control said drive means, said one-way clutch being operatively connected to said limit switch in such a manner as to shut off said drive means when said one-way clutch slips, an actuator arm yieldably positioned in the path of containers on said conveyor adjacent said star wheel and operatively connected to said limit switch in such a manner as to shut off the drive means when there are no containers on said container conveyor at said star wheel, a dispenser arm pivotally mounted adjacent the exit end of said material conveyor and swingable past said blade to strike a portion cut by said blade into a container positioned below said blade, and a cam fixed with relation to said blade and arranged to actuate said dispenser arm each time said blade rotates.

6. Apparatus for depositing sliced portions of material into containers which comprises a first conveyor, rotary drive means, a rotary cutter blade positioned adjacent the exit end of said conveyor for cutting portions from a length of material moving on said conveyor, said rotary blade being positively connected to said drive means for driving thereby, a container conveyor positioned to move containers under the exit end of said first conveyor, means for sensing the speed of containers on said container conveyor, a limit switch arranged to control said drive means, said sensing means being operatively connected to said limit switch in such a manner as to shut off said drive means when the rate of passing said sensing means is less than the rate of cutting of said blade, an actuator arm yieldably positioned in the path of containers on said container conveyor adjacent said star wheel and operatively connected to said limit switch in such a manner as to shut off the drive means when there are no cans on said container conveyor at said star wheel.

7. Apparatus for depositing sliced portions of material into cans which comprises a conveyor, rotary drive means, means coupling said drive means and conveyor so as to provide intermittent movement of said conveyor, a rotary cutter blade positioned adjacent the exit end of said conveyor for cutting portions from a length of material moving on said conveyor, said rotary blade being positively connected to said drive means for driving thereby in such a manner that said blade cuts when said conveyor is stationary, a can conveyor positioned to move cans under the exit end of said first conveyor, a star wheel positioned adjacent said can conveyor under the exit end of said first conveyor and having recesses about its periphery adapted to receive the cans as they move along said can conveyor, a one-way clutch connecting said drive means and star wheel in such a manner that said star wheel cannot rotate faster than a given speed determined by the speed of said drive means but can rotate at lesser speeds than said given speed by slipping of said one-way clutch, a limit switch arranged to control said drive means, said one-way clutch being operatively connected to said limit switch in such a manner as to shut off said drive means when said one-way clutch slips, an actuator arm yieldably positioned in the path of cans on said can conveyor adjacent said star wheel and operatively connected to said limit switch in such a manner as to shut off the drive means when there are no cans on said can conveyor at said star wheel.

8. Apparatus for depositing sliced portions of material into containers which comprises a frame, a conveyor mounted on said frame, rotary drive means mounted on said frame, a one-way clutch coupled to said conveyor, a pitman connected at one end to said rotary drive means for rotation thereby and coupled at its other end to said one-way clutch for oscillation thereof to intermittently drive said conveyor, a rotary cutter blade rotatably mounted on said frame adjacent the exit end of said conveyor for cutting portions from a length of material moving on said conveyor, said rotary blade being positively connected to said drive means for driving thereby, a can conveyor positioned to move cans under the exit end of said first conveyor, a star wheel rotatably mounted on said frame and positioned adjacent said first conveyor and having recesses about its periphery adapted to receive the cans as they move along said can conveyor so that the star wheel rotates with the movement of the cans, a second one-way clutch connecting said drive means and star wheel, said second one-way clutch including a cup-shaped member positively connected to said drive means for rotation thereby, said cup-shaped member having a plurality of indentations around its inner surface, a shaft pivoted to and extending through said star wheel eccentrically of the axis thereof, a finger fixed with relation to said shaft and received within said cup-shaped member, a tension spring secured at one end to said star wheel and at the other end to said finger and urging said finger into said indentations and against the inner surface of said cup-shaped member, said shaft being in a first position when said finger is in an indentation and in a second position when said finger is against said inner surface, said finger pointing somewhat outwardly but generally in the direction of rotation of said cup-shaped member and said star wheel whereby any tendency of said star wheel to rotate faster than said cup-shaped member under the action of said cans is resisted by the locking of said finger into one of said indentations and any tendency for said star wheel to rotate slower than said cup-shaped member under the action of said cans results in said finger moving out of said one indentation and in the pivoting of said shaft from said first position to said second position, a cam fixed with relation to said shaft and having a tapering cam surface, a limit switch arranged to control said drive means, an actuating arm for said limit switch, said actuating arm positioned at the axis of rotation of said star wheel, said cam being moved toward said axis to actuate said actuating arm when said shaft is in said second position and moved away from said axis to disengage said actuating arm when said shaft is in said first position, a second actuating arm yieldably positioned in the path of cans on said can conveyor adjacent said star wheel and operatively connected to said limit switch in such a manner as to shut off the drive means when there are no cans on said conveyor at said star wheel.

9. Apparatus for depositing sliced portions of material into cans which comprises a conveyor, rotary drive means, a one-way clutch coupled to said conveyor, an arm fixed to and projecting radially from said one-way clutch, a pitman connected at one end to said rotary drive means for rotation thereby and coupled at its other end to said one-way clutch arm for oscillation thereof and of said one-way clutch to intermittently drive said conveyor, a solenoid actuated arm movable to block oscillation of said one-way clutch arm, a rotary cutter blade positioned adjacent the exit end of said conveyor for cutting portions from a length of material moving on said conveyor, said rotary blade being positively connected to said drive means for driving thereby, a can conveyor positioned to move cans under the exit end of said conveyor, a star wheel positioned adjacent said can conveyor and having recesses about its periphery adapted to receive the cans as they move along said can conveyor, a second one-way clutch connecting said drive means and star wheel in such a manner that said star wheel is limited by said drive means as to maximum speed of rotation, a limit switch arranged to control said drive means and solenoid, said second one-way clutch being operatively connected to said limit switch in such a manner as to shut off said drive means and actuate said solenoid when said second one-way clutch slips, an actuator arm yieldably positioned in the path of cans on said can conveyor adjacent said star wheel and operatively connected to said limit switch in such a manner as to shut off the drive means and actuate said solenoid when there are no cans on said can conveyor at said star wheel, said pitman being resiliently compressible whereby actuation of said solenoid to block oscillation of said clutch arm causes absorption of the inertia of said rotary drive means.

10. A control arrangement for a drive means comprising a one-way clutch including a cup-shaped member positively connected to said drive means for rotation thereby, said cup-shaped member having a plurality of indentations around its inner surface, a driven means, a shaft pivoted to and extending through said driven means eccentrically of the axis thereof, a finger fixed with relation to said shaft and received within said cup-shaped member, a tension spring secured at one end to said driven means and at the other end to said finger and urging said finger into said indentations and against the inner surface of said cup-shaped member, said shaft being in a first position when said finger is in an indentation and in a second position when said finger is against said inner surface, said finger pointing somewhat outwardly but generally in the direction of rotation of said cup-shaped member and said driven means whereby any tendency of said driven means to rotate faster than said cup-shaped member is resisted by the locking of said finger into one of said indentations and any tendency for said driven means to rotate slower than said cup-shaped member results in said finger moving out of said one indentation and in the pivoting of said shaft from said first position to a said second position, a cam fixed with relation to said shaft and having a tapering cam surface, a limit switch arranged to control said drive means, an actuating arm for said limit switch, said actuating arm positioned at the axis of rotation of said star wheel, said cam being moved toward said axis to actuate said actuating arm when said shaft is in said second position and moved away from said axis to disengage said actuating arm when said shaft is in said first position.

11. A control arrangement for a drive means comprising a one-way clutch including a rotatable driven member and a coaxial rotatable driving member driven by said drive means, ratchet means connecting said members and permitting rotation of said driven member in one direction relative to said driving member but preventing rotation of said driven member in the other direction relative to said driving member, a shaft pivoted to said driven means eccentrically of the axis thereof, said shaft being pivotal between two angularly spaced positions by said ratchet means, a cam fixed to said shaft and having a tapering surface, a limit switch arranged to control said drive means, an actuating arm for said limit switch, said actuating arm positioned at the axis of rotation of said driven means, said cam being spaced from the axis of said shaft whereby said cam is moved toward the axis of said driven means to actuate said actuating arm when said shaft is in one of said positions and away from the axis of said driven means to disengage said actuating arm when said shaft is in the other of said two positions.

References Cited by the Examiner

UNITED STATES PATENTS

| | | | |
|---|---|---|---|
| 873,606 | 12/07 | Rhoades | 139—190 |
| 1,356,007 | 10/20 | Pasquariello | 192—45.1 |
| 1,411,830 | 4/22 | Atkinson | 254—183 |
| 2,154,212 | 4/39 | Moorhouse | 192—45.1 |
| 2,359,671 | 10/44 | Pearson | 53—67 |
| 2,661,881 | 12/53 | Kasper | 53—67 |
| 2,860,464 | 11/58 | Barthelemy | 53—59 X |
| 2,895,273 | 7/59 | Lakso | 53—115 X |
| 2,967,386 | 1/61 | Hill | 53—123 |
| 3,010,499 | 11/61 | Dahms et al. | 53—123 X |
| 3,038,281 | 6/62 | Quisel | 53—59 X |

FRANK E. BAILEY, *Primary Examiner.*

ROBERT A. LEIGHEY, TRAVIS S. McGEHEE,
*Examiners.*